United States Patent
Hayashi

(10) Patent No.: US 8,913,343 B2
(45) Date of Patent: Dec. 16, 2014

(54) ROTATING DEVICE USING A FLUID DYNAMIC BEARING WITH MAGNET AND SUCTION PLATE

(75) Inventor: Daiki Hayashi, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 37 days.

(21) Appl. No.: 13/523,362

(22) Filed: Jun. 14, 2012

(65) Prior Publication Data

US 2013/0027807 A1 Jan. 31, 2013

(30) Foreign Application Priority Data

Jul. 28, 2011 (JP) ................................. 2011-165332

(51) Int. Cl.
*G11B 19/20* (2006.01)
*G11B 25/04* (2006.01)

(52) U.S. Cl.
CPC ................................. *G11B 19/2036* (2013.01)
USPC ........................ 360/99.08; 310/67 R; 310/90

(58) Field of Classification Search
CPC .................................................. G11B 19/2036
USPC ......... 360/98.08, 98.07, 99.08; 310/90, 67 R; 384/107
See application file for complete search history.

(56) References Cited

U.S. PATENT DOCUMENTS

| 5,623,382 | A * | 4/1997 | Moritan et al. | 360/99.08 |
| 2004/0176261 | A1* | 9/2004 | Tojou et al. | 508/485 |
| 2005/0116564 | A1* | 6/2005 | Tokunaga et al. | 360/99.08 |
| 2005/0140220 | A1* | 6/2005 | Tsuda et al. | 360/99.08 |
| 2006/0244326 | A1* | 11/2006 | Tamaoka | 360/99.08 |
| 2007/0001531 | A1* | 1/2007 | Nagai | 360/98.07 |
| 2007/0188033 | A1* | 8/2007 | Hada | 360/99.08 |
| 2010/0124387 | A1* | 5/2010 | Fuss et al. | 384/107 |
| 2010/0264763 | A1* | 10/2010 | Kull | 384/107 |
| 2011/0064341 | A1* | 3/2011 | Mizuno et al. | 360/99.08 |
| 2012/0183243 | A1* | 7/2012 | Sugiki | 384/107 |

FOREIGN PATENT DOCUMENTS

JP 2011-58595 3/2011

* cited by examiner

*Primary Examiner* — Craig A. Renner
(74) *Attorney, Agent, or Firm* — Blank Rome LLP

(57) ABSTRACT

A disk drive device comprises: a hub; a base rotatably supporting the hub via a bearing; a core fixed to the base; a cylindrical magnet fixed to the hub; and a suction plate fixed to the base, the suction plate being arranged to face the cylindrical magnet in a direction along the rotational axis and made of magnetic material. The suction plate is arranged so that the minimum distance between the suction plate and the rotational axis is greater than the minimum distance between the cylindrical magnet and the rotational axis. A projection area created by projecting the cylindrical magnet onto a plane that is perpendicular to the rotational axis partially overlaps a projection area created by projecting the suction plate onto the plane.

17 Claims, 5 Drawing Sheets

100

100

ROTATING DEVICE USING A FLUID DYNAMIC BEARING WITH MAGNET AND SUCTION PLATE

CROSS-REFERENCE TO RELATED APPLICATIONS

This application is based upon and claims the benefit of priority from the prior Japanese Patent Application No. 2011-165332, filed on Jul. 28, 2011, the entire contents of which are incorporated herein by reference.

BACKGROUND OF THE INVENTION

1. Field of the Invention

The present invention relates to a rotating device using a fluid dynamic bearing.

2. Description of the Related Art

Disk drive devices, such as hard disk drives, have become miniaturized and the capacity of a disk drive device has steadily increased. Such disk drive devices have been installed in various types of electronic devices, in particular, devices such as laptop computers and portable music players.

The present applicant had proposed, in Japanese Patent Application Publication No. 2011-58595, a disk drive device using a fluid dynamic bearing. This disk drive device comprises: a rotor having a ring-shaped magnet; a stator having a stator core; a fluid dynamic bearing rotatably supporting the rotor with respect to the stator; and a suction plate facing an axially lower end surface of the magnet mounted to the stator via a gap. Magnetic attraction force in the axial direction is generated between the suction plate and the magnet. This attraction force works so that the entire rotor to which the magnet is coupled is attracted toward the base side; thereby vibration of the rotor is suppressed.

SUMMARY OF THE INVENTION

In general, portable electronic devices are required to be miniaturized and thin. Therefore, disk drive devices to be installed in such portable electronic devices must also be miniaturized and thin. Thinning the disk drive device represented by Japanese Patent Application Publication No. 2011-58595 will entail reducing the distance between the magnet and the suction plate. In such a case, the attraction force may become larger and the portion of magnetic flux that contributes to rotation may be reduced; thereby performance with regard to torque may deteriorate.

Such disadvantage may occur not only in the disk drive device but also in other types of rotating devices.

The present invention addresses these disadvantages, and a general purpose of one embodiment of the present invention is to provide a rotating device that can suppress deterioration of torque performance even if the rotating device is thinned.

An embodiment of the present invention relates to a rotating device. This rotating device comprises a hub on which a recording disk is to be mounted; a base rotatably supporting the hub via a fluid dynamic bearing; a core fixed to the base, the core having a ring portion and a plurality of teeth that radially extend from the ring portion; a plurality of coils wound around the plurality of teeth; a magnet fixed to the hub, the magnet being magnetized for driving with a plurality of poles along the circumferential direction and arranged to radially face the plurality of teeth; and a suction plate fixed to the base, the suction plate being arranged to face the magnet in a direction along the rotational axis of the hub and being made of magnetic material. The suction plate is arranged so that the minimum distance between the suction plate and the rotational axis of the hub is greater than the minimum distance between the magnet and the rotational axis of the hub. A projection area created by projecting the magnet onto a plane that is perpendicular to the rotational axis of the hub partially overlaps a second projection area created by projecting the suction plate onto the plane.

Optional combinations of the aforementioned constituting elements and implementations of the invention in the form of methods, apparatuses, or systems can also be practiced as additional modes of the present invention.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention but to exemplify the invention. The size of the component in each figure may be changed in order to aid understanding. Some of the components in each figure may be omitted if they are not important for explanation.

A disk drive device according to an embodiment is an example of a rotating device and is preferably used as a hard disk drive having a magnetic recording disk.

In the disk drive device according to the embodiment that adopts a so-called outer-rotor type structure, an inner diameter of a suction plate arranged for attracting a magnet toward a base side is made greater than an inner diameter of the magnet. This can suppress the increase of magnetic flux that originates from the magnet and that enter the suction plate even if the distance between the magnet and the suction plate is reduced due to thinning of the disk drive device. As a result, reduction of torque due to thinning of the disk drive device can be alleviated.

Figure 1A:
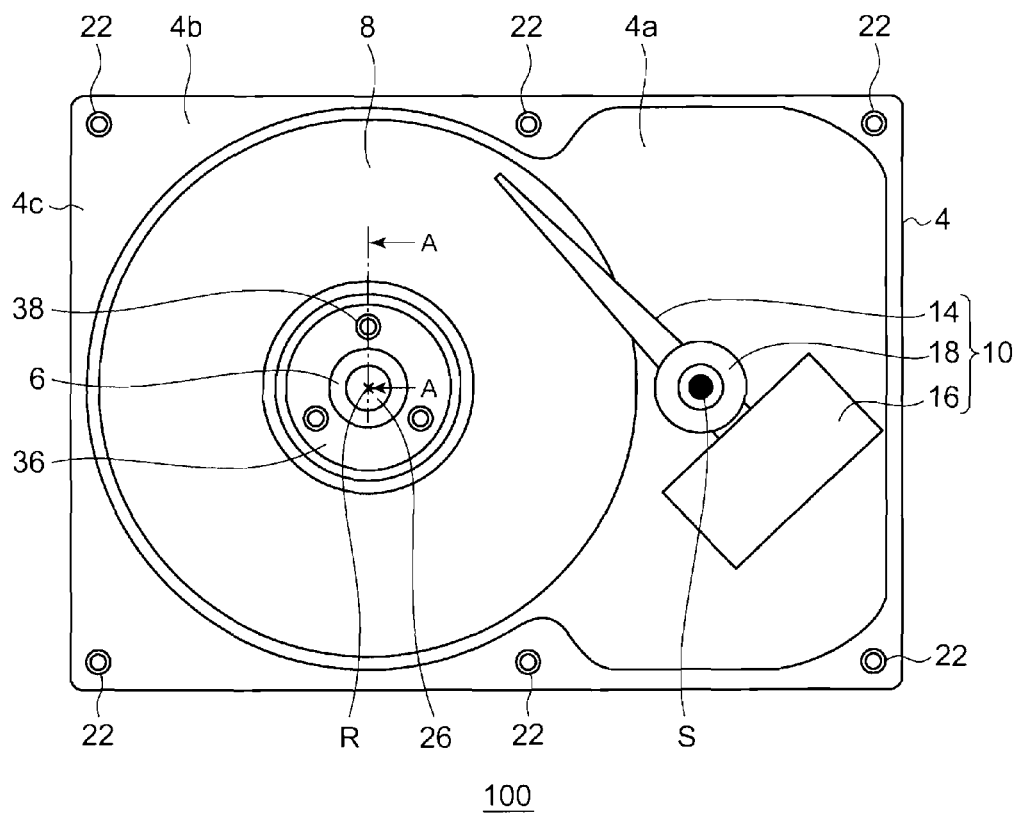
FIG. 1A and FIG. 1B are a top view and a side view of a disk drive device according to an embodiment, respectively.
Figure 1B:
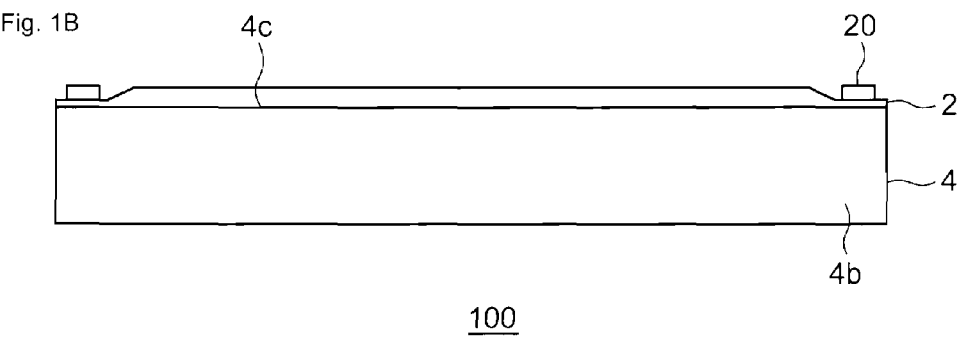

FIG. 1A and FIG. 1B are a top view and a side view of the disk drive device 100 according to the embodiment, respectively. FIG. 1A is a top view of the disk drive device 100 according to the embodiment. In FIG. 1A, the disk drive device 100 is shown without a top cover 2 in order to show the inside of the disk drive device 100. The disk drive device 100 comprises: a base 4; a rotor 6; a magnetic recording disk 8; a data read/write unit 10; and the top cover 2.

Hereinafter, it is assumed that the side of the base 4 on which the rotor 6 is installed is the "upper" side.

The magnetic recording disk 8 is mounted on the rotor 6, and rotates with the rotor 6. The rotor 6 is rotatably mounted to the base 4 through the bearing unit 12, which is not shown in FIG. 1A. The base 4 is produced by die-casting an alloy of aluminum. The base 4 includes: a bottom plate 4a forming the bottom portion of the disk drive device 100; and an outer circumference wall 4b formed along the outer circumference of the bottom plate 4a so that the outer circumference wall 4b surrounds an installation region of the magnetic recording disk 8. Six screw holes 22 are formed on the upper surface 4c of the outer circumference wall 4b.

The data read/write unit 10 includes: a read/write head (not shown); a swing arm 14; a voice coil motor 16; and a pivot assembly 18. The read/write head is attached to the tip of the swing arm 14. The read/write head records data onto and reads out data from the magnetic recording disk 8. The pivot assembly 18 swingably supports the swing arm 14 with respect to the base 4 around the head rotation axis S. The voice coil motor 16 swings the swing arm 14 around the head rotation axis S and moves the read/write head to the desired position on the upper surface of the magnetic recording disk 8. The voice coil motor 16 and the pivot assembly 18 are constructed using a known technique for controlling the position of the head.

FIG. 1B is a side view of the disk drive device 100 according to the embodiment. The top cover 2 is fixed onto the upper surface 4c of the outer circumference wall 4b of the base 4 using six screws 20. The six screws 20 correspond to the six screw holes 22, respectively.

Figure 2:
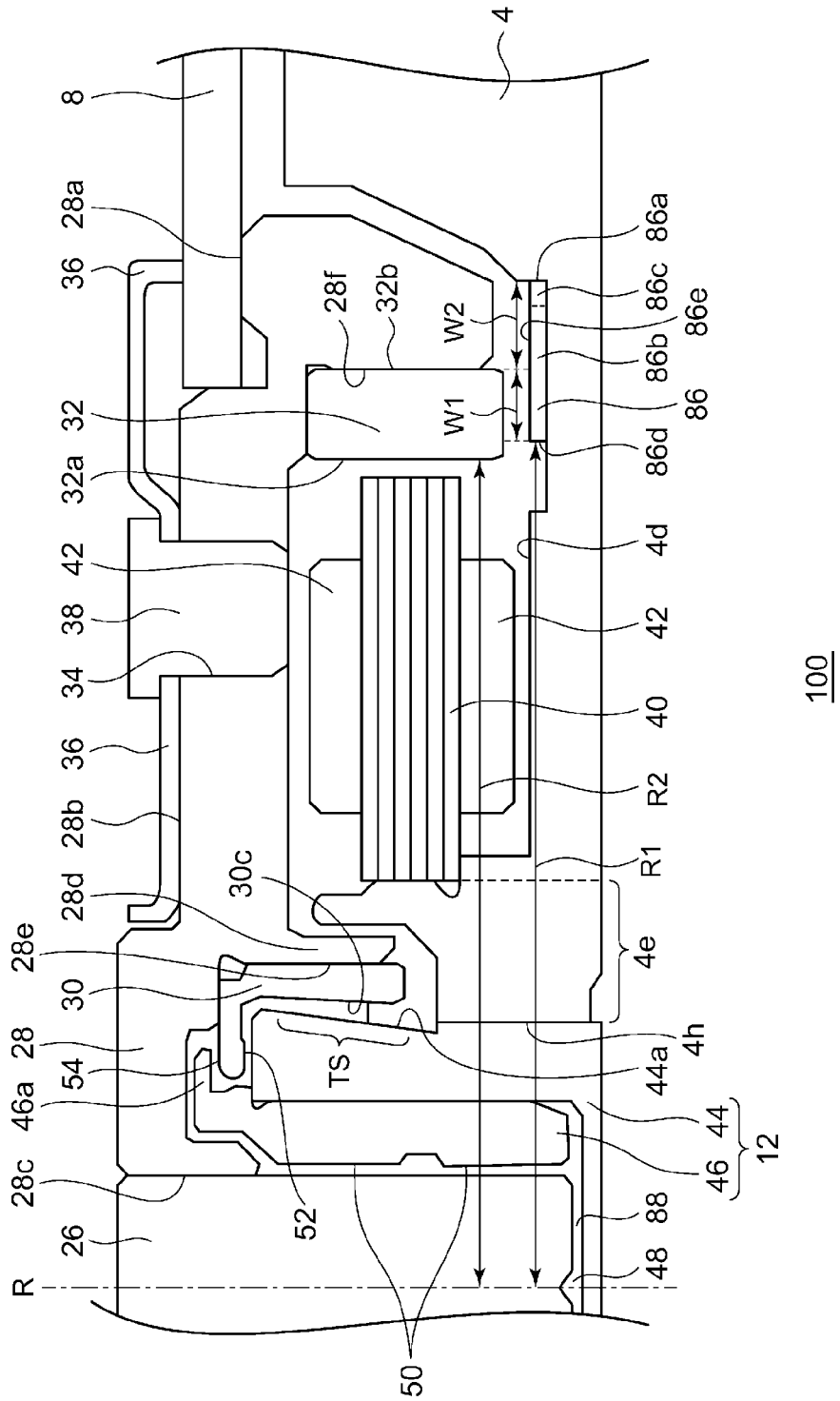
FIG. 2 is a section view sectioned along A-A line in FIG. 1A.

FIG. 2 is a view that is sectioned along the line A-A, as illustrated in FIG. 1A. The rotor 6 includes a shaft 26, a hub 28, a thrust ring 30 and a cylindrical magnet 32. The magnetic recording disk 8 is mounted on a disk-mount surface 28a of the hub 28. Three screw holes 34 for affixing a disk are arranged on the upper surface 28b of the hub 28 at 120-degree intervals around the rotational axis R of the rotor 6. The clamper 36 is pressed against the upper surface 28b of the hub 28 by three screws 38 for affixing a disk, which are screwed in the corresponding three screw holes 34 for affixing a disk. The clamper 36 presses the magnetic recording disk 8 against the disk-mount surface 28a of the hub 28.

The hub 28 is made of magnetic material such as SUS430F. The hub 28 is formed to be predetermined cup-like shape by, for example, the press working or cutting of a steel plate. For example, the hub 28 may preferably be made of the stainless steel (DHS1) provided by Daido Steel Co., Ltd., since the stainless steel has lower outgas and is easily-worked. The hub 28 may more preferably be made of the stainless steel (DHS2) provided by Daido Steel Co., Ltd., since the stainless steel has high corrosion resistance.

The shaft 26 is fixed in the hole 28c arranged at the center of the hub 28 by using both press-fitting and glue, the hole 28c being arranged coaxially with the rotational axis R of the rotor 6.

The thrust ring 30 is in ring-shape and has a reverse L-shaped cross section. The thrust ring 30 is glued on an inner surface 28e of a hanging portion 28d of the hub 28.

The cylindrical magnet 32 is glued on a cylindrical inner surface 28f that is an inner cylindrical surface of the cup-like hub 28. The cylindrical magnet 32 is made of a rare-earth material such as Neodymium, Iron, or Boron. An inner surface 32a of the cylindrical magnet 32 radially (i.e., in a direction perpendicular to the rotational axis R) faces twelve teeth of the laminated core 40. The cylindrical magnet 32 is magnetized with sixteen magnetic poles along the circumferential direction (i.e., in a tangential direction of a circle that is perpendicular to the rotational axis R and the center of which is at the rotational axis R) in a sinusoidal manner. Magnetizing the cylindrical magnet 32 in a sinusoidal manner can reduce cogging torque. The surface of the cylindrical magnet 32 is treated for preventing rusting by electro deposition coating or spray coating.

The disk drive device 100 further comprises a bearing unit 12, a laminated core 40, coils 42, and a suction plate 86. The base 4 rotatably supports the hub 28 through the bearing unit 12. A ring-shaped wall 4e, the center of which is along the rotational axis R of the rotor 6, is formed on the upper surface 4d of the base 4. The ring-shaped wall 4e protrudes upwardly and surrounds the bearing unit 12. An inner surface of the ring-shaped wall 4e forms the bearing hole 4h in which the bearing unit 12 is inserted and glued.

The bearing unit 12 includes the housing 44 and the sleeve 46. The housing 44 is formed to be cup-shaped by integrating a cylindrical portion and a bottom portion as a single unit. The housing 44 is glued in the bearing hole 4h of the base 4 with the bottom portion downside. The cylindrical sleeve 46 is glued on the inner side surface of the housing 44. A jetty portion 46a, which radially outwardly juts out, is formed at the upper end of the sleeve 46. This jetty portion 46a, in cooperation with the thrust ring 30, limits the motion of the rotor 6 in the direction along the rotational axis R.

The sleeve 46 accommodates the shaft 26. The lubricant 48 is injected into a lubricant fill space 88 in between part of the rotor (the shaft 26, the hub 28, and the thrust ring 30) and the bearing unit 12.

A pair of herringbone-shaped radial dynamic pressure generation grooves 50, which are vertically separated from each other, are formed on the inner surface of the sleeve 46. A first set of herringbone-shaped or spiral-shaped thrust dynamic pressure generation grooves 52 is formed on a lower surface of the thrust ring 30 that faces the upper surface of the housing 44. A second set of herringbone-shaped or spiral-shaped thrust dynamic pressure generation grooves 54 is formed on an upper surface of the thrust ring 30 that faces the lower surface of the jetty portion 46a. The rotor 6 is axially and radially supported by the dynamic pressure generated in the lubricant 48 by the radial dynamic pressure generation grooves and the thrust dynamic pressure generation grooves when the rotor 6 rotates.

Therefore, the shaft 26, the sleeve 46, the thrust ring 30, the housing 44 and the lubricant 48 form fluid dynamic bearing that rotatably supports the rotor 6 by pressure generated in the lubricant 48 when the rotor 6 rotates.

The pair of herringbone-shaped radial dynamic pressure generation grooves may be formed on the shaft 26. The first thrust dynamic pressure generation grooves can be formed on the upper surface of the housing 44, and the second thrust dynamic pressure generation grooves may be formed on the lower surface of the jetty portion 46a. Alternatively, thrust dynamic pressure generation grooves may be formed on a part of the lower surface of the hub 28 that faces the jetty portion 46a or on a upper surface of the jetty portion 46a.

A capillary seal TS, where the gap between the inner surface 30c of the thrust ring 30 and the outer surface 44a of housing 44 gradually increases downward, is formed on the upside of the housing 44. The capillary seal TS prevents the leakage of the lubricant 48 by way of the capillary effect. The inner surface 30c of the thrust ring 30 is formed so that the radius of the inner surface 30c decreases axially downward. In this case, the centrifugal force associated with the rotation of the rotor 6 applies the lubricant 48 a force directed towards the inside of the lubricant 48.

The laminated core 40 has a ring portion and twelve teeth, which extend radially outwardly from the ring portion, and is fixed on the upper surface 4d side of the base 4. The laminated core 40 is formed by laminating six thin magnetic steel sheets and mechanically integrating them. An insulation coating is applied onto the surface of the laminated core 40 by electrodeposition coating or powder coating. Each of the coils 42 is wound around one of the twelve teeth, respectively. A driving flux is generated along the teeth by applying a three-phase sinusoidal driving current through the coils 42.

The suction plate 86 is flat and ring-shaped. The suction plate 86 is made of magnetic material such as silicon steel. An outer surface 86a of the suction plate 86 opposite to the rotational axis R is substantially radially pressed against the base 4; thereby the suction plate 86 is fixed to the base 4. The suction plate 86 faces the cylindrical magnet 32 in the axial direction. Since the suction plate 86 is made of magnetic material, the suction plate 86 and the cylindrical magnet 32 are magnetically attracted to each other. This may apply an axially-downward force on the cylindrical magnet 32; thereby levitation and vibration of the rotor 6 can be suppressed while rotating.

The suction plate 86 is formed so that the minimum distance between the suction plate 86 and the rotational axis R is greater than the minimum distance between the cylindrical magnet 32 and the rotational axis R. In particular, in this embodiment, the inner surface 86d of the suction plate 86 on the rotational axis R side is a cylindrical surface the center of which is along the rotational axis R. The inner surface 32a of the cylindrical magnet 32 is a cylindrical surface the center of which is along the rotational axis R. Therefore, the minimum distance between the suction plate 86 and the rotational axis R is the radius R1 of the inner surface 86d of the suction plate 86, and the minimum distance between the cylindrical magnet 32 and the rotational axis R is the radius R2 of the inner surface 32a of the cylindrical magnet 32. The suction plate 86 is formed so that the radius R1 is greater than the radius R2.

In designing the disk drive device 100, it is possible to compute a levitation force Ff and an attraction force Fa of the suction plate 86 using simulations, etc., the levitation force Ff acts to levitate the rotor 6 as it rotates. For example, one can construct a model using input parameters such as a rotational speed, a size of the gap at a dynamic pressure generation portion, and the shape of a dynamic pressure generation groove. One can compute the levitation force Ff using the constructed model. Also, by numerically analyzing the magnetic field in the disk drive device 100, it is possible to compute the attraction force Fa.

By using such simulations at the design stage, the proper radius R1 of the inner surface 86d of the suction plate 86 is determined so that the magnitude of the attraction force Fa is obtained by multiplying the mass of the magnetic recording disk 8 plus the mass of the rotor 6 by a design-target acceleration ranging from 19.6 m/s$^2$ to 38.2 m/s$^2$. The suction plate 86 is arranged so that the magnitude of magnetic flux received by the suction plate from the inner surface 32a of the cylindrical magnet 32 substantially is equal to the magnitude of magnetic flux received by the hub 28 from the inner surface 32a.

Figure 3:
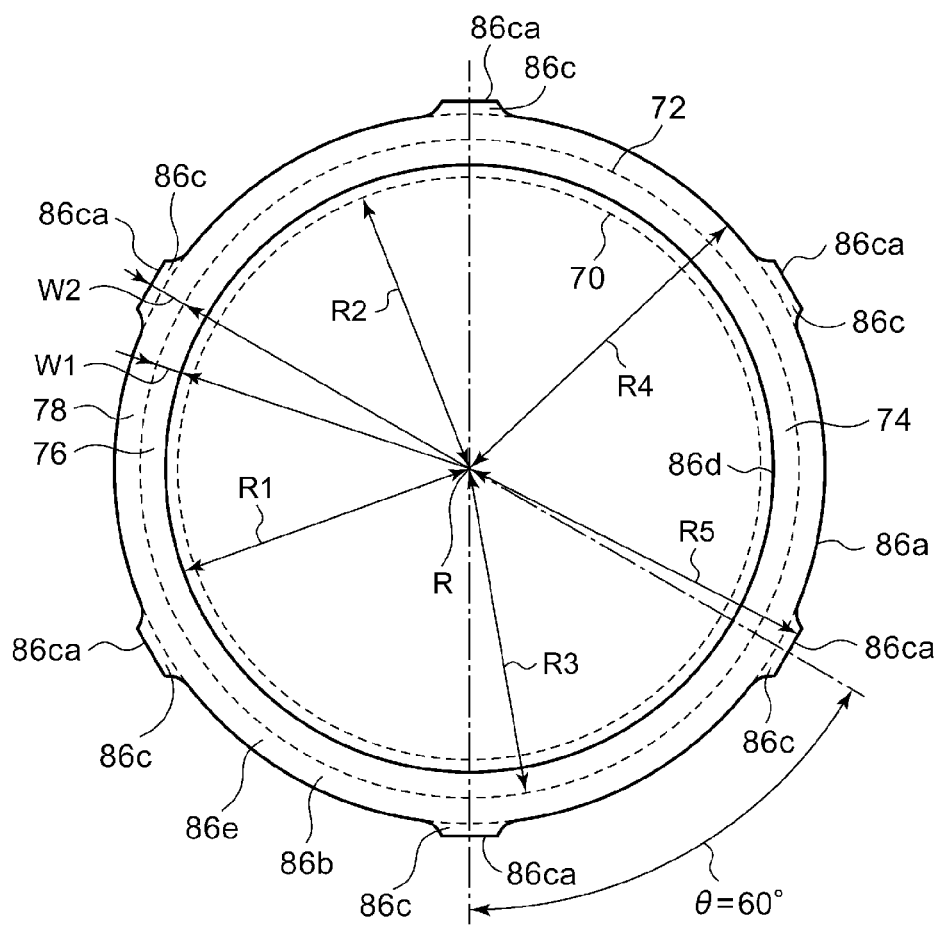
FIG. 3 is a top view of a suction plate.

FIG. 3 shows a top view of the suction plate 86. The suction plate 86 has a ring portion 86b and six protruding portions 86c that radially outwardly extend from the ring portion 86b. The six protruding portions 86c are arranged evenly around the rotational axis R, i.e., at θ=60° intervals around the rotational axis R. The six protruding portions 86c are pressed against the base 4 by, for example, mechanical integration; thereby the suction plate 86 is fixed to the base 4.

Since the upper surface 86e of the suction plate 86 is substantially perpendicular to the rotational axis R, the upper surface 86e is included in a plane (hereinafter referred to as a projection plane) that is perpendicular to the rotational axis R. It can be said that FIG. 3 is a top view of the projection plane. In FIG. 3, dashed-line circles 70, 72 respectively correspond to the inner surface 32a and the outer surface 32b of the cylindrical magnet 32 when the cylindrical magnet 32 is projected onto the projection plane. In FIG. 3, a ring-shaped planar area 74 between the circle 70 and the circle 72 is a projection area obtained by projecting the cylindrical magnet 32 onto the projection plane. The upper surface 86e of the suction plate 86 is a projection area obtained by projecting the suction plate 86 onto the projection plane. The planar area 74 partially overlaps the upper surface 86e of the suction plate 86. In particular, the upper surface 86e of the suction plate 86 has an overlap portion 76 overlapping the planar area 74 and a non-overlap portion 78. The non-overlap portion 78 does not overlap the planar area 74.

The maximum width, in the radial direction, of the overlap portion 76 is less than the maximum width, in the radial direction, of the non-overlap portion 78. In particular, in this embodiment, since a circle on the projection plane that corresponds to the inner surface 86d of the suction plate 86 and the circle 72 on the projection plane that corresponds to outer surface 32b of the cylindrical magnet 32 are concentric with each other with the center at the position of the rotational axis R, the overlap portion 76 is a ring-shaped planar area. The width W1, in the radial direction, of the overlap portion 76 substantially is constant. The maximum width, in the radial direction, of the non-overlap portion 78 is given as the width W2 at the protruding portion 86c. The width W1, in the radial direction, of the overlap portion 76 is less than the width W2, in the radial direction, of the non-overlap portion 78, the width W2 being given at the protruding portion 86c.

The disk drive device 100 is arranged so that R2<R1<R3<R4<R5 is satisfied, where R3 is the radius of the circle 72 corresponding to the outer surface 32b of the cylindrical magnet 32, R4 is the radius of the outer periphery of the ring portion 86b of the suction plate 86, R5 is a distance between an end surface 86c a of the protruding portion 86c of the suction plate 86 and the rotational axis R, the end surface 86c a touching the base 4. Examples of dimensions are as follows:

R1=8.75 mm;
R2=8.5 mm;
R3=9.5 mm;
R4=10.1 mm;
R5=10.5 mm;
W1=R3−R1=0.75 mm; and
W2=R5−R3=1 mm.

The operation of the disk drive device 100 as described above shall be described below. A three-phase driving current is supplied to the coils 42 to rotate the magnetic recording disk 8. Drive flux is generated along the twelve teeth by making the driving current flow through the coils 42. This driving flux gives torque to the cylindrical magnet 32, and the rotor 6 and the magnetic recording disk 8, which is fitted to the rotor 6, rotate. Along with this, the voice coil motor 16 swings the swing arm 14, and the read/write head goes back and forth within the swing range on the magnetic recording disk 8. The read/write head converts magnetic data recorded on the magnetic recording disk 8 to an electrical signal and transmits the electrical signal to a control board (not shown). The read/write head also converts data sent from the control board in a form of an electrical signal to magnetic data and writes the magnetic data on the magnetic recording disk 8.

In the disk drive device 100 according to this embodiment, the radius R1 of the inner surface 86d of the suction plate 86 is greater than the radius R2 of the inner surface 32a of the cylindrical magnet 32. Therefore, in comparison with the case in which the radius R1 is not, a portion of magnetic flux originating from the inner surface 32a of the cylindrical magnet 32 and acting on the suction plate 86 can be reduced. In that, the attraction force Fa of the suction plate 86 can be reduced. This can suppress the increase of a portion of magnetic flux that acts not on the laminated core 40 but on the suction plate 86 even if the disk drive device 100 is thinned and the cylindrical magnet 32 gets closer to the suction plate 86. As a result, reduction of torque due to the suction plate 86 can be suppressed.

In general, a torque increases as a product of the magnitude of magnetic flux acting on the laminated core and the magnitude of the driving current flowing through the coils 42 increases. Therefore, in prior art, the driving current is increased in order to compensate for reduction of magnetic flux acting on the laminated core. In the disk drive device 100 according to this embodiment, it may not be necessary to increase the driving current, or even in the case where it is necessary, the driving current should be increased by only a small amount. As a result, an increase of power consumption of the disk drive device 100 due to thinning of the disk drive device 100 can be suppressed.

Another option other than this embodiment would be to compensate for reduction of magnetic flux acting on the laminated core by strengthening the magnetic force of the cylindrical magnet using rectangular wave magnetization. However, in the disk drive device 100 according to this embodiment, it is not necessary to do so and it is possible to use a sinusoidal wave magnetization method with less cogging torque.

Since most portable electronic devices are battery-powered, adopting the low-power-consumption disk drive device 100 according to this embodiment can lengthen the battery-lasting-period of the portable electronic devices. Therefore, the disk drive device 100 preferably is installed in portable electronic devices.

In the disk drive device 100 according to this embodiment, the projection area created by projecting the cylindrical magnet 32 onto the projection plane partially overlaps the projection area created by projecting the suction plate 86 onto the projection plane. Therefore, the distance between the inner surface 32a of the cylindrical magnet 32 and the suction plate 86 is maintained so that the suction plate 86 keeps its attraction function.

Figure 4A:
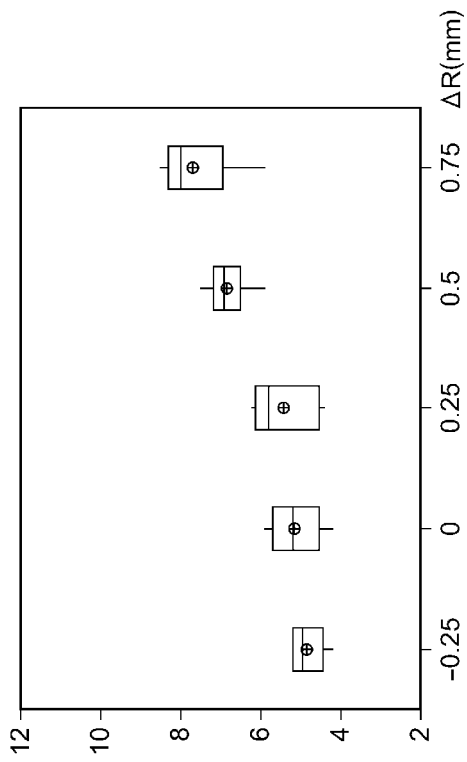
FIG. 4A and FIG. 4B are graphs that show changes of torque and levitation of a rotor due to a change of the radius of an inner surface of the suction plate, respectively.
Figure 4B:
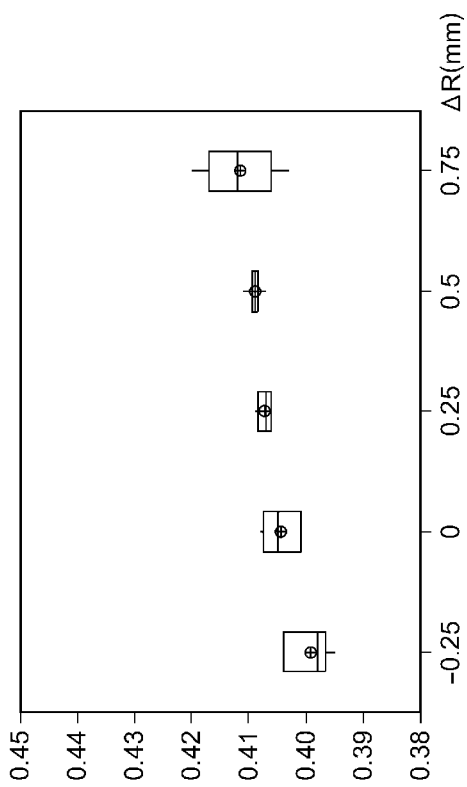

The present inventors prepared a plurality of disk drive devices with different radii R1 of the inner surfaces of the suction plates and performed investigation using these disk drive devices. FIG. 4A and FIG. 4B are graphs that show changes of torque and levitation of a rotor due to a change of the radius R1 of an inner surface of the suction plate, respectively; and In FIG. 4A, the horizontal axis of the graph shows the difference ΔR (=R1−R2) between the radius R1 of the inner surface of the suction plate and the radius R2 of the inner surface of the cylindrical magnet in mm, and the vertical axis of the graph shows the magnitude of torque in arbitrary unit. It can be seen that the torque increases as the radius R1 of the inner surface of the suction plate increases. In FIG. 4B, the horizontal axis of the graph shows ΔR, and the vertical axis of the graph shows levitation of the rotor in arbitrary unit. It can be seen that the levitation starts to increase at around the point where ΔR exceeds 0.5 mm.

The outer surface of the suction plate is pressed against the base; thereby the suction plate is fixed. The suction plate may be deformed due to the pressure of this pressing. For example, asperity such as rippling in the circumferential direction may occur on the outer-surface side of the upper surface of the suction plate. If the suction plate is rather narrow in the radial direction, such asperity may occur on the inner-surface side of the upper surface of the suction plate. If large asperity occurs on the inner-surface side of the upper surface of the suction plate, the inner-surface side being closer to the inner surface 32a of the cylindrical magnet 32, received magnetic flux originating from the inner surface of the cylindrical magnet may change according to the asperity. This change may create unevenness of rotation.

Therefore, in the disk drive device 100 according to this embodiment, the width W1, in the radial direction, of the overlap portion 76 is less than the width W2, in the radial direction, of the non-overlap portion 78, the width W2 being given at the protruding portion 86c. As a result, the overlap portion 76 is separated from the end surface 86c a of the protruding portion 86c at least by the radial width W1 of the overlap portion 76. This can suppress the creation of asperity at the overlap portion 76.

In the case where the suction plate is fixed to the base by applying load to the whole outer periphery of the suction plate, even a slight unevenness of the swage load applied to the outer periphery may cause a large deformation of the suction plate. If the suction plate is deformed, it may be difficult to keep the gap between the suction plate and the cylindrical magnet 32 uniform along the circumferential direction. If this gap becomes non-uniform, the attraction force between the suction plate and the cylindrical magnet 32 changes in the circumferential direction. This may make the rotation of the rotor 6 unstable. In the worst case, the suction plate may touch the cylindrical magnet 32.

To cope with this, in the disk drive device 100 according to this embodiment, the suction plate 86 has a ring portion 86b and six protruding portions 86c that radially outwardly extend from the ring portion 86b. The six protruding portions 86c are fixed to the base 4 by, for example, mechanical integration; thereby the suction plate 86 is fixed to the base 4. In this situation, loads are applied to the six protruding portions 86c. Therefore, in comparison with the case where the suction plate is fixed to the base by applying load to the whole outer periphery of the suction plate, the deformation of the suction plate 86 can be suppressed.

If the attraction force Fa of the suction plate is too small, the difference in levitation of the rotor 6 before and after the disk drive device is turned over is rather large. The change in levitation may cause a change in position, in the axial direction, of the magnetic recording disk 8. Therefore, if the attraction force Fa is too small, a position of the magnetic recording disk 8 relative to the read/write head may widely change according to the orientation of the disk drive device. In some cases, this large change may interfere with the read/write of data. On the other hand, if the attraction force Fa is large, magnetic flux entering the laminated core 40 decreases accordingly and the driving current may increase. In addition, a larger force may be required in order to levitate the rotor 6 by the thrust dynamic pressure bearing. Since this may increase the rotational speed required to levitate the rotor 6, the thrust dynamic pressure bearing may maintain its touching state for a longer time during start-up or shut-down of the disk drive device 100. In the touching state, for example, the lower surface of the thrust ring 30 touches the upper surface of the housing 44. As a result, not only the start-up time or the start-up current may increase, but also the bearing lifetime may be shortened due to abrasion. In addition, since the fact that the attraction force Fa is large is equivalent to the fact that magnetic flux entering the suction plate is relatively large, eddy current or hysteresis loss in the suction plate may increase. As a result, rotational load may increase; thereby the driving current may increase.

To cope with this, in the disk drive device 100 according to this embodiment, the magnitude of the attraction force Fa in design is a magnitude obtained by multiplying sum of the mass of the magnetic recording disk 8 and the mass of the rotor 6 by an acceleration ranging from 19.6 m/s$^2$ to 38.2 m/s$^2$. Since the attraction force Fa is set within a proper range (not too large or not too small), effect due to the difference in the orientation of the disk drive device 100 is suppressed to the extent in which no practical issue occurs. In addition, increase of the driving current is suppressed.

In the disk drive device 100 according to this embodiment, the magnitude of magnetic flux received by the suction plate 86 from the inner surface 32a of the cylindrical magnet 32 substantially amounts to the magnitude of magnetic flux received by the hub 28 from the inner surface 32a. By doing so, misalignment between a magnetic center, which is the center, in the axial direction, of the magnetic flux distribution originating from the inner surface 32a of the cylindrical magnet 32 and the center, in the axial direction, of the tooth of laminated core 40 can be suppressed. As a result, a sound noise frequency spectrum component of the disk drive device 100 can be reduced, the frequency component corresponding to (the number of driving phases)×(the number of magnetic poles)×(rotational speed) (3×16×N=48N in this embodiment) and being caused by torque ripple.

Most of magnetic flux originating from the inner surface 32a of the cylindrical magnet 32 enters the teeth of the laminated core 40. Other parts of the magnetic flux enter the suction plate 86 and the hub 28. If the magnitude of magnetic flux received by the suction plate is largely different from the magnitude of magnetic flux received by the hub, the axial distribution of magnetic fluxes received by the teeth of the laminated core is skewed to either one of the sides. In a design stage, the magnetic center of the cylindrical magnet 32 and the center of the tooth of the laminated core 40 are designed to be aligned with each other without considering effects from other components. Therefore, these centers may be misaligned if the skew of the distribution of magnetic flux occurs.

For example, in the case where the magnitude of magnetic flux received by the hub is greater than the magnitude of magnetic flux received by the suction plate, the axial distribution of magnetic flux received by the teeth of the laminated core is skewed to the suction-plate side. In this situation, the magnetic center of the cylindrical magnet gets closer to the suction-plate side and it becomes misaligned with the center of the tooth of the laminated core. In the reverse case where the magnitude of magnetic flux received by the suction plate is greater, the magnetic center of the cylindrical magnet gets closer to the hub-side and it becomes misaligned with the center of the tooth of the laminated core as well.

Experiences of the present inventors as skilled artisans teach that, in comparison with the case where the magnetic center of the cylindrical magnet and the center of the tooth of the laminated core are aligned with each other, the sound noise frequency spectrum component that corresponds to (the number of driving phases)×(the number of magnetic poles)×(rotational speed) increases in the case where the two centers are not aligned.

Figure 5A:
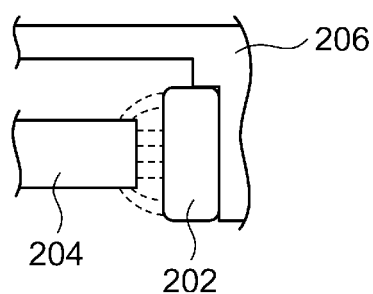
FIG. 5A, FIG. 5B, and FIG. 5C schematically show distributions of magnetic flux that originate from inner surfaces of cylindrical magnets.
Figure 5B:
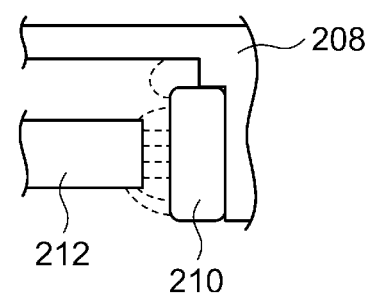
Figure 5C:
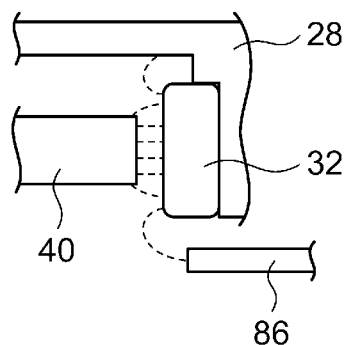

FIG. 5A, FIG. 5B, and FIG. 5C schematically show distributions of magnetic flux that originate from inner surfaces of cylindrical magnets. In these figures, lines of magnetic flux are shown as dashed lines. FIG. 5A corresponds to a comparison example in which most of magnetic flux originating from an inner surface of a cylindrical magnet 202 are received by a laminated core 204. In this comparison example, a hub 206 is made of non-magnetic material, and the disk drive device according to this comparison example does not have a suction plate. In this comparison example, by dimensionally aligning the center of the tooth of the laminated core with the center of the inner surface of the cylindrical magnet in the axial direction, the magnetic center of the cylindrical magnet can be aligned with the center of the tooth.

FIG. 5B corresponds to a comparison example in which a hub 208 is made of magnetic material and receives magnetic flux. Since a part of magnetic flux originating from the inner surface of the cylindrical magnet 210 deviates toward the hub 208, the part being closer to the hub 208, the magnitude of magnetic flux received by the laminated core 212 on the hub-side decreases accordingly. In this situation, the magnetic center of the cylindrical magnet is closer to the base-side.

FIG. 5C corresponds to this embodiment in which the suction plate 86 receives substantially the same magnitude of magnetic flux as that received by the hub 28. Similar to the case of FIG. 5B, the magnitude of magnetic flux received by the laminated core 40 on the hub 28 side decreases. Moreover, since a part of magnetic flux originating from the inner surface 32a of the cylindrical magnet 32 deviates toward the suction plate 86, the part being closer to the base 4, the magnitude of magnetic flux received by the laminated core 40 on the base 4 side decreases accordingly. As a result, the magnetic center, which is closer to the base side in FIG. 5B, comes back toward the hub 28 side and becomes aligned with the center of the tooth of the laminated core 40.

Above is an explanation for the structure and operation of the disk drive device 100 according to the embodiment. This embodiment is intended to be illustrative only, and it will be obvious to those skilled in the art that various modifications to constituting elements and processes could be developed and that such modifications are also within the scope of the present invention.

The embodiment describes the case where the bearing unit 12 is fixed to the base 4, and the shaft 26 rotates with respect to the bearing unit 12. However, the present invention is not limited to this. For example, the present invention can be applied to a shaft-fixed type of the rotating device in which the shaft is fixed to the base, and the bearing unit and the hub rotate together with respect to the shaft.

The embodiment describes the case where the bearing unit 12 is directly mounted onto the base 4. However, the present invention is not limited to this. For example, a brushless motor comprising a rotor, a bearing unit, a laminated core, coils, a suction plate and a base can separately be manufactured, and the manufactured brushless motor can be installed on a chassis.

The embodiment describes the case where the laminated core is used. However, the present invention is not limited to this. For example, sintered cores of soft magnetic material such as iron or ferrite can be used.

The embodiment describes the case where the housing 44 and the sleeve 46 are manufactured separately. However, the present invention is not limited to this. For example, the housing and the sleeve may be integrated as a single unit. In this case, the number of components of the device can be reduced and it becomes less time-consuming to assemble the device.

The embodiment describes the case where the upper surface 86e of the suction plate 86 is included in the projection plane. However, the present invention is not limited to this. For example, the projection plane may be an arbitrary plane, which is perpendicular to the rotational axis R.

What is claimed is:
1. A rotating device, comprising:
a hub on which a recording disk is to be mounted;
a base rotatably supporting the hub via a fluid dynamic bearing;

a core fixed to the base, the core having a ring portion and a plurality of teeth that radially extend from the ring portion;

a plurality of coils wound around the plurality of teeth;

a magnet fixed to the hub, the magnet being magnetized for driving with a plurality of magnetic poles along a circumferential direction and arranged to radially face the plurality of teeth; and a suction plate fixed to the base, the suction plate being arranged to face the magnet in a direction along a rotational axis of the hub and made of magnetic material, wherein the suction plate is arranged so that a minimum distance between the suction plate and the rotational axis of the hub is greater than a minimum distance between the magnet and the rotational axis of the hub, wherein a first projection area created by projecting the magnet onto a plane that is perpendicular to the rotational axis of the hub partially overlaps a second projection area created by projecting the suction plate onto the plane, wherein a maximum width, in a radial direction, of a part of the second projection area that overlaps the first projection area is less than a maximum width, in the radial direction, of the rest of the second projection area, and wherein a surface of the base facing the hub includes: a flat surface that faces at least a part of the plurality of coils in the direction along the rotational axis of the hub; and a recess provided radially outside of the flat surface with respect to the rotational axis, wherein the suction plate is fixed to the base by pressing an outer side of the suction plate into the recess.

2. The rotating device according to claim 1, wherein the suction plate has a ring portion and a plurality of protruding portions that radially extend outward from the ring portion of the suction plate, and wherein the suction plate is fixed to the base by pressing the plurality of protruding portions onto the base.

3. The rotating device according to claim 2, wherein the minimum distance R1 between the suction plate and the rotational axis of the hub, the minimum distance R2 between the magnet and the rotational axis of the hub, a radius R3 of an outer surface of the magnet, a radius R4 of an outer periphery of the ring portion of the suction plate, and a distance R5 between an outer surface of the plurality of protruding portions of the suction plate and the rotational axis of the hub satisfy a relationship of R2 <R1 <R3 <R4 <R5.

4. The rotating device according to claim 1, wherein the minimum distance between the suction plate and the rotational axis of the hub is determined, in design, so that a magnitude of an attraction force between a rotor and the suction plate is a magnitude obtained by multiplying a mass of the rotor plus a mass of the recording disk by an acceleration ranging from 19.6 m/s$^2$ to 38.2 m/s$^2$, the rotor including the hub and the magnet and rotating with respect to the base.

5. The rotating device according to claim 1, wherein the hub is made of magnetic material, and wherein the suction plate is arranged so that a magnitude of magnetic fluxes received by the suction plate from a surface of the magnet that faces the plurality of teeth substantially is equal to a magnitude of magnetic fluxes received by the hub from the surface of the magnet.

6. The rotating device according to claim 5, wherein a dimensional center of a tooth of the plurality of teeth is aligned, in a direction along the rotational axis of the hub, with a dimensional center of the surface of the magnet that faces the plurality of teeth.

7. The rotating device according to claim 1, wherein an inner surface of the suction plate is a cylindrical surface around the rotational axis of the hub, and an inner surface of the magnet is a cylindrical surface around the rotational axis of the hub.

8. The rotating device according to claim 1, wherein the magnet is magnetized with the plurality of magnetic poles along the circumferential direction in a sinusoidal manner.

9. A rotating device, comprising:

a hub on which a recording disk is to be mounted;

a base rotatably supporting the hub via a fluid dynamic bearing;

a core fixed to the base, the core having a ring portion and a plurality of teeth that radially extend from the ring portion;

a plurality of coils wound around the plurality of teeth;

a magnet fixed to the hub, the magnet being magnetized for driving with a plurality of magnetic poles along a circumferential direction and arranged to radially face the plurality of teeth; and a suction plate fixed to the base, the suction plate being arranged to face the magnet in a direction along a rotational axis of the hub and made of magnetic material, wherein the suction plate is arranged so that a minimum distance between the suction plate and the rotational axis of the hub is greater than a minimum distance between the magnet and the rotational axis of the hub, wherein a first projection area created by projecting the magnet onto a plane that is perpendicular to the rotational axis of the hub partially overlaps a second projection area created by projecting the suction plate onto the plane, wherein a width, in a radial direction, of a part of the second projection area that overlaps the first projection area is less than a width, in the radial direction, of the rest of the second projection area, and wherein a surface of the base facing the hub includes: a flat surface that faces at least a part of the plurality of coils in the direction along the rotational axis of the hub; and a recess provided radially outside of the flat surface with respect to the rotational axis, wherein the suction plate is fixed to the base by pressing an outer side of the suction plate into the recess.

10. The rotating device according to claim 9, wherein a dimensional center of a tooth of the plurality of teeth is aligned, in a direction along the rotational axis of the hub, with a dimensional center of the surface of the magnet that faces the plurality of teeth.

11. The rotating device according to claim 9, wherein the suction plate has a ring portion and a plurality of protruding portions that radially extend outward from the ring portion of the suction plate, and wherein the suction plate is fixed to the base by pressing the plurality of protruding portions onto the base.

12. The rotating device according to claim 11, wherein the minimum distance R1 between the suction plate and the rotational axis of the hub, the minimum distance R2 between the magnet and the rotational axis of the hub, a radius R3 of an outer surface of the magnet, a radius R4 of an outer periphery of the ring portion of the suction plate, and a distance R5 between an outer surface of the plurality of protruding portions of the suction plate and the rotational axis of the hub satisfy a relationship of R2 <R1 <R3 <R4 <R5.

13. The rotating device according to claim 9, wherein the minimum distance between the suction plate and the rotational axis of the hub is determined, in design, so that a magnitude of an attraction force between a rotor and the suction plate is a magnitude obtained by multiplying a sum of a mass of the rotor plus a mass of the recording disk by an acceleration value ranging from 19.6 m/s² to 38.2 m/s², the rotor including the hub and the magnet and rotating with respect to the base.

14. The rotating device according to claim 9, wherein the hub is made of magnetic material, and wherein the suction plate is arranged so that a magnitude of magnetic fluxes received by the suction plate from a surface of the magnet that faces the plurality of teeth substantially is equal to a magnitude of magnetic fluxes received by the hub from the surface of the magnet.

15. A rotating device, comprising:
a hub on which a recording disk is to be mounted, the hub being made of magnetic material;
a base rotatably supporting the hub via a fluid dynamic bearing;
a core fixed to the base, the core having a ring portion and a plurality of teeth that radially extend from the ring portion;
a plurality of coils wound around the plurality of teeth,
a magnet fixed to the hub, the magnet being magnetized for driving with a plurality of magnetic poles along a circumferential direction and arranged to radially face the plurality of teeth; and
a suction plate fixed to the base, the suction plate being arranged to face the magnet in a direction along a rotational axis of the hub and made of magnetic material,
wherein the suction plate is arranged so that a minimum distance between the suction plate and the rotational axis of the hub is greater than a minimum distance between the magnet and the rotational axis of the hub,
wherein a magnetic center of the magnet is aligned with a center of each tooth of the plurality of teeth,
wherein a first projection area created by projecting the magnet onto a plane that is perpendicular to the rotational axis of the hub partially overlaps a second projection area created by projecting the suction plate onto the plane,
wherein a maximum width, in a radial direction, of a part of the second projection area that overlaps the first projection area is less than a maximum width, in the radial direction, of the rest of the second projection area, and
wherein a surface of the base facing the hub includes: a flat surface that faces at least a part of the plurality of coils in the direction along the rotational axis of the hub; and a recess provided radially outside of the flat surface with respect to the rotational axis, wherein the suction plate is fixed to the base by pressing an outer side of the suction plate into the recess.

16. The rotating device according to claim 15, wherein the suction plate has a ring portion and a plurality of protruding portions that radially extend outward from the ring portion of the suction plate, and wherein the suction plate is fixed to the base by pressing the plurality of protruding portions onto the base.

17. The rotating device according to claim 15, wherein the minimum distance between the suction plate and the rotational axis of the hub is determined, in design, so that a magnitude of an attraction force between a rotor and the suction plate is a magnitude obtained by multiplying a sum of a mass of the rotor plus a mass of the recording disk by an acceleration value ranging from 19.6 m/s² to 38.2 m/s², the rotor including the hub and the magnet and rotating with respect to the base.

* * * * *